United States Patent [19]

Nalesnik et al.

[11] Patent Number: 4,663,064

[45] Date of Patent: May 5, 1987

[54] DIBAISIC ACID LUBRICATING OIL DISPERSANT AND VITON SEAL ADDITIVES

[75] Inventors: Theodore E. Nalesnik, Beacon; Carmen M. Cusano, Poughkeepsie, both of N.Y.

[73] Assignee: Texaco Inc., White Plains, N.Y.

[21] Appl. No.: 845,723

[22] Filed: Mar. 28, 1986

[51] Int. Cl.[4] .......................................... C10M 133/16
[52] U.S. Cl. ................................................ 252/51.5 A
[58] Field of Search ..................................... 252/51.5 A

[56] References Cited

U.S. PATENT DOCUMENTS 4,482,464 11/1984 Karol et al. .................. 252/51.5 A
4,521,318 6/1985 Karol ............................ 252/51.5 A Primary Examiner—Jacqueline V. Howard
Attorney, Agent, or Firm—Robert A. Kulason; James J. O'Loughlin; Vincent A. Mallare

[57] ABSTRACT

A lubricating oil composition having improved dispersancy and viton seal compatibility. The dispersant being prepared by coupling partially glycolated succinimides with an organic diacid.

12 Claims, No Drawings

DIBAISIC ACID LUBRICATING OIL DISPERSANT AND VITON SEAL ADDITIVES

BACKGROUND OF THE INVENTION

1. Field of the Invention

Internal combustion engines operate under a wide range of temperatures including low temperature stop-and-go service as well as high temperature conditions produced by continuous high speed driving. Stop-and-go driving, particularly during cold, damp weather conditions, leads to the formation of a sludge in the crankcase and in the oil passages of a gasoline or a diesel engine. This sludge seriously limits the ability of the crankcase oil to effectively lubricate the engine. In addition, the sludge with its entrapped water tends to contribute to rust formation in the engine. These problems tend to be aggravated by the manufacturer's lubrication service recommendations which specify extended oil drain intervals.

It is known to employ nitrogen containing dispersants and/or detergents in the formulation of crankcase lubricating oil compositions. Many of the known dispersant/detergent compounds are based on the reaction of an alkenylsuccinic acid or anhydride with an amine or polyamine to produce an alkylsuccinimide or an alkenylsuccinamic acid as determined by selected conditions of reaction.

It is also known to chlorinate alkenylsuccinic acid or anhydride prior to the reaction with an amine or polyamine in order to produce a reaction product in which a portion of the amine or polymaine is attached directly to the alkenyl radical of the alkenylsuccinic acid or anhydride. The thrust of many of these processes is to produce a product having a relatively high level of nitrogen in order to provide improved dispersancy in a crankcase lubricating oil composition.

With the introduction of four cylinder internal combustion engines which must operate at relatively higher engine speeds or RPM's than conventional 6- and 8-cylinder engines in order to produce the required torque output, it has become increasingly difficult to provide a satisfactory dispersant lubricating oil composition.

Another problem facing the lubricant manufacturer is that of seal deterioration in the engine. All internal combustion engines use elastomer seals, such as Vitron seals, in their assembly. Over time, these seals are susceptible to serious deterioration caused by the lubricating oil composition. A lubricating oil composition that degrades the elastomer seals in an engine is unacceptable to engine manufacturers and has limited value.

It is an object of this invention to provide a novel lubricating oil additive.

Another object is to provide a novel lubricating oil composition which does not degrade elastomer seals in internal combustion engines.

A still further object is to provide a lubricating oil composition which can withstand the stresses imposed by modern internal combustion engines.

2. Disclosure Statement

U.S. Pat. Nos. 3,172,892 and 4,048,080 disclose alkenylsuccinimides formed from the reaction of an alkenylsuccinic anhydride and an alkylene polyamine and their use as dipersants in a lubricating oil composition.

U.S. Pat. No. 2,568,876 discloses reaction products prepared by reacting a monocarboxylic acid with a polyalkylene polyamine followed by a reaction of the intermediate product with an alkenyl succinic anhydride.

U.S. Pat. No. 3,216,936 discloses a process for preparing an aliphatic amine lubricant additive which involves reacting an alkylene amine, a polymer substituted succinic acid and an aliphatic monocarboxylic acid.

U.S. Pat. No. 3,131,150 discloses lubricating oil compositions containing dispersant-detergent mono- and di-alkyl-succinimides or bis(alkenylsucinimides).

Netherlands Pat. No. 7,509,289 discloses the reaction product of an alkenylsuccinic anhydride and an aminoalcohol, namely a tris(hydroxymethyl)-aminomethane.

U.S. patent application, Ser. No. 334,774, filed on Dec. 28, 1981, discloses a hydrocarbyl-substituted succinimide dispersant having a secondary hydroxy-substituted diamine or polyamine segment and a lubricating oil composition containing same.

U.S. Pat. No. 4,338,205 discloses alkenyl succinimide and borated alkenyl succinimide dispersants for a lubricating oil with impaired diesel dispersancy in which the dispersant is treated with an oil-soluble strong acid.

The disclosures of U.S. Pat. No. 3,172,892, U.S. Pat. No. 4,048,080 and of U.S. patent application Ser. No. 334,774 are incorporated herein by reference.

SUMMARY OF THE INVENTION

The present invention provides a novel additive which improves the dispersancy and viton seal compatibility of a lubricating oil. The lubricating oil composition comprises a major portion of a lubricating oil and a minor dispersant amount of a reaction product prepared by the process which (a) reacting a polyethylene amine with an alkenyl succinic acid anhydride to form a bis-alkenyl succinimide;

(b) acylating said bis-alkenyl-succinimide with glycolic acid to form a partially glycolated bis-alkenyl succinimide;

(c) adding a diacid to said glycolated bis-alkenyl succinimide, thereby forming an acylated diacid coupled glycamide bis-alkenyl succinimide; and (d) recovering said acylated diacid coupled glycamide bis-alkenyl succinimide.

DESCRIPTION OF THE INVENTION

The charge polyamine compositions which may be employed in practice of the process of this invention according to certain of its aspects may include primary or secondary amines. The amines may typically be characterized by the formula

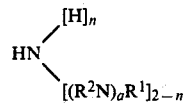

Where a may be an integer of about 1 to about 6, preferably about 5; and n may be an integer of 0 or 1.

In the above compound, $R^1$ may be hydrogen or a hydrocarbon group selected from the group consisting of alkyl, aralkyl, cycloalkyl, aryl, alkaryl, alkenyl, and alkynyl including such radicals when inertly substituted. When $R^1$ is alkyl, it may typically be methyl, ethyl, n-propyl, iso-propyl, n-butyl, i-butyl, sec-butyl, amyl, octyl, decyl, octadecyl, etc. When $R^1$ is aralkyl, it may typically be benzyl, betaphenylethyl, etc. When R[1] is cycloalkyl, it may typically be cyclohexyl, cycloheptyl, cyclooctyl, 2-methylcyclo-heptyl, 3-butylcyclohexyl, 3-methylcyclohexyl, etc. When R[1] is aryl, it may typically be phenyl, naphthyl, etc. When R[1] is alkaryl, it may typically be tolyl, xylyl, etc. When R[1] is alkenyl, it may typically be vinyl, allyl, 1-butenyl, etc. When R[1] is alkynyl, it may typically be ethynyl, propynyl, butynyl, etc. R[1] may be inertly substituted i.e. it may bear a non-reactive subsitutent such as alkyl, aryl, cycloalkyl, ether, halogen, nitro, etc. Typically inertly substituted R[1] groups may include 3-chloropropyl, 2-ethoxyethyl, carboethoxymethyl, 4-methyl, cyclohexyl, p-chlorophenyl, p-chlorobenzyl, 3-chloro-5-methylphenyl, etc. The preferred R[1] groups may be hydrogen or lower alkyl, i.e. $C_1$–$C_{10}$ alkyl, groups including e.g. methyl, ethyl, n-propyl, i-propyl, butyls, amyls, hexyls, octyls, decyls, etc. R[1] may preferably be hydrogen.

And, similarly, R[2] may be a hydrocarbon selected from the same group as R[1] subject to the fact that R[2] is divalent and contains one less hydrogen. Preferably R[1] is hydrogen and R[2] is —$CH_2CH_2$—. Typical amines which may be employed may include those listed below in Table I.

TABLE I propylenediamine (PDA)
diethylenetriamine (DETA)
triethylenetetramine (TETA)
tetraethylenepentamine (TEPA)
pentaethylenehexamine (PEHA)

The preferred amine may be tetraethylenepentamine.

The charge diacids which may be employed in the practice of the presnt process may be characterized by the formula $$HO_2C\text{—}(R^3)\text{—}CO_2H$$

R[3] is a hydrocarbon group selected from the group consisting of alkyl, aralkyl, cycloalkyl, aryl, alkaryl alkenyl and alkynyl.

In the practice of the process of this invention, the reagents are step wise reacted with a succinic acid anhydride bearing a polyolefin substituent containing residual unsaturation in a "one pot reaction".

The succinic acid anhydride may be characterized by the following formula

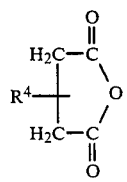

In the above formula, R[4] may be a residue (containing residual unsaturation) from a polyolefin which was reacted with maleic acid anhydride to form the alkenyl succinic acid anhydride. R[4] may have a molecular weight $\overline{M}_n$ ranging from about 500 to about 2000, preferably about 1000 to about 1300, and more preferably about 1300.

The Diacid coupled glycamide bis-alkenyl succinimide is prepared by the following sequence of steps in a single flask preparation as shown below in Scheme I. The first step of the reaction sequence involves reacting a polyethyleneamine with an alkenyl succinic acid anhydride (ASAA), respectively, in a 1:2 molar ratio to form the bis-alkenyl succinimide (A) intermediate. To this intermediate (A) is added enough glycolic acid to acylate all of the free basic amines except for one or one equivalent amine to form the partially glycolated bis-alkenyl succinimide (B). To this succinimide (B) is added a Diacid to form the Diacid coupled glycolated bis-alkenyl succinimide (C).

The product so obtained may be a 50–80, say 50 wt. % solution of the desired additive in an inert diluent; and preferably it is used in this form.

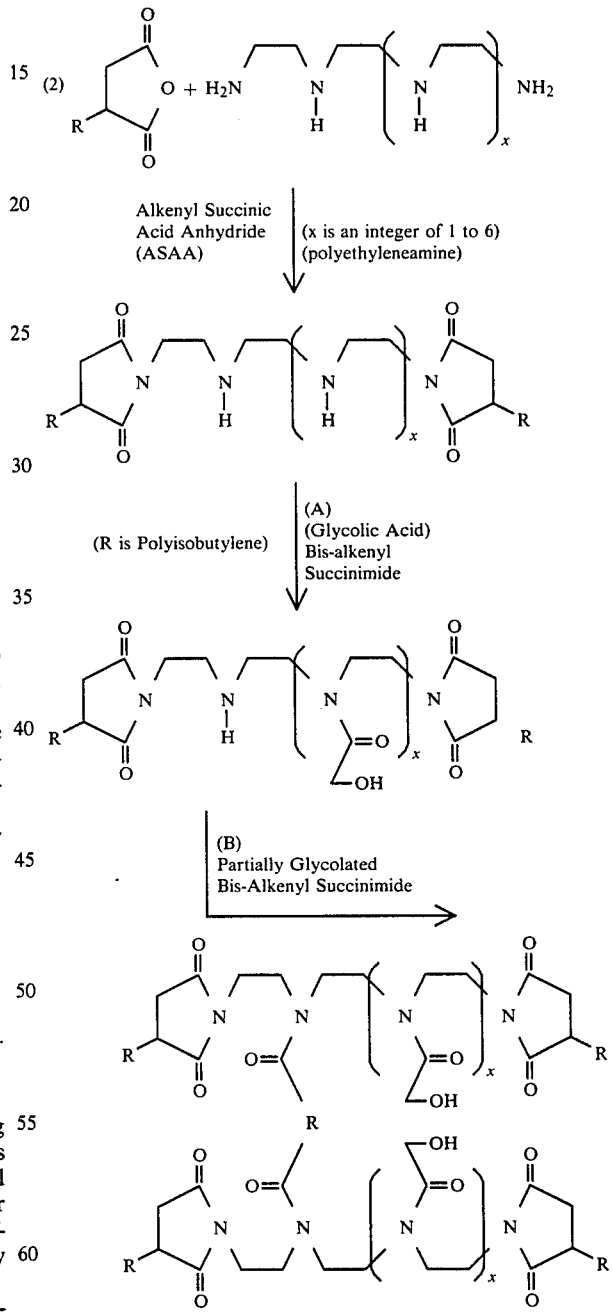

The preferred acylating agents which are carboxylic acids may be glycolic acid; oxalic acid; lactic acid; 2-hydroxymethyl propionic acid, or 2,2-bis(hydroxymethyl) propionic acid. The most preferred being glycolic acid.

Acetylation may be effected preferably by addition of the acetylating agent (e.g., glycolic acid or oxalic acid) to the reaction product of the polyethyleneamine and the succinic acid anhydride.

Acylation is preferably effected by adding the acylating agent (typically oxalic acid or glycolic acid) in an amount of about 0.5 to about 3.0 equivalents per mole of active amine employed.

For example, when tetraethylenepentamine (TEPA) is employed, there are 1.7 equivalents of glycolic acid added. Similarly, when triethylenetetramine (TETA) is used, about 0.7 equivalent of glycolic acid is added; and when pentaethylenehexamine (PEHA) is employed, about 2.7 equivalents of glycolic acid are added to the reaction.

During acylation, the carboxyl group of the acylating agent bonds to a nitrogen atom to form an amide. Acylation is carried out at 100° C.-180° C., say 160° C. for 2-24 hours, say 8 hours preferably in the presence of an excess of inert diluent-solvent.

The partially acylated product may in one of its embodiments be represented by the formula

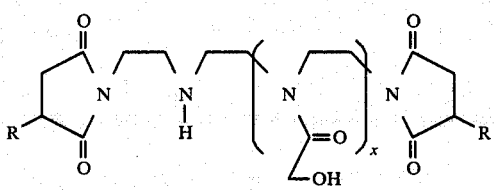

wherein R is polyisobutylene.

In order to illustrate the effectiveness of the present compounds, i.e., coupled glycolated succinimides, as dispersants with viton seal compatibility, there are several tests to which the present succinimides have been subjected. These tests include the Bench VC and VD Tests, the Sequence VD Engine Test, and the Daimler-Benz Viton Compatibility Test. These tests are described below in more detail as well as the results of the various tests are provided below in Tables II, III and IV.

THE BENCH VC TEST (BVCT)

This test is conducted by heating the test oil mixed with a synthetic hydrocarbon blowby and a diluetn oil at a fixed temperature for a fixed time period. After heating, the trubidity of the resulting mixture is measured. A low percentage trubidity (0 to 10) is indicative of good dispersancy while a high value (20 to 100) is indicative of an oil's increasingly poor dispersancy. The results obtained with the known and present dispersants are set forth in Table II below at 6 and 4 percent by weight concentration respectivley, in an SAE 10W-40 fully formulated motor oil.

THE BENCH VD TEST (BVDT)

In the Bench VD Test, (BVDT), oil samples are artificially degraded by bubbling air for six hours through a mixture of test oil and synthetic blowby at 290° F. Every hour, synthetic blowby is added and at the 5th and 6th hour of the test, samples are removed and diluted with SNO-7/20 diluent oil and their turbidity measured. Low turbidity in the BVDT indicates good lubricant dispersancy as related to the Sequence VD Test. The Sequench VD engine correlation work predicts that SF (i.e. satisfactory) quality lubricants should read 60 or less in the BVDT (trubidity units); oils 70 or greater would be predicted to do significantly poorer in the Sequence VD Test.

Reference standard: The reference oil standard used in this test has had an average Sequence VD deposit rating of 6.81=Average varnish, 9.56=Average sludge. In the BVDT the 6 hour turbidity should be 55+/−12. The reference oil is included in each BVDT run. The resultant BVDT runs are provided below in Table II.

TABLE II

BVDT[1] Evaluations of GBSD[2]
Preparative Variations in Adipic Acid Treat Level and order of addition

| Dispersant[3] | | BVDT[4] |
|---|---|---|
| 1. GBSD | (commercial) | 104,101 |
| 2. GBSD | (amine/apidic: 0.25)[5] | 55,47 |
| 3. GBSD | (amine/adipic: 0.50) | 58,60 |
| 4. GBSD | (amine/adipic: 1.0) | 43,63 |
| 5. GBSD | (all adipic acid, no glycolic acid) | 87,90[6] |
| 6. GBSD | (amine/adipic: 0.5, adipic acid added together with glycolic acid) | 152,160 |
| 7. GBSD | (adipic acid added to commercial GBSD, 8 hours/160° C.) | 38 |
| 8. Bis Succinimide | (no pre-acylation, PEHA) | 28 |
| 9. Bis Succinimide | (No pre-acylation, PEHA, H-300 ASAA) | 51 |
| 10. Bis-Succinimide | (No pre-acylation, PEHA, Succinic Anhydride) | 73 |

[1]All dispersants were evaluated at 7.4 wt. % in a single grade SAE 30 SF/CD formulation.
[2]GBSD is a Glycamide bis-succinimide dispersant (90% bis and 10% mono).
[3]All dispersants were prepared from H-300 Indopol ASAA and TEPA polyethyleneamine.
[4]The lower the value, the better the performance.
[5]The amine/adipic acid ratio refers to the ole ratio of TEPA to adipic acid in the dispersant preparation.
[6]Prepared using PEHA instead of TEPA.
TEPA - Tetraethylenepentamine
PEHA - Pentaethylenehexamine
ASAA - Alkenyl succinic acid anhydride: H-50 ASAA (mw ≈ 750); H-100 ASAA (mw ≈ 1000); H-300 ASAA (mw ≈ 1300)

SEQUENCE-VD TEST

Various dispersants including known dispersant and the present dispersants were tested by the Sequence VD gasoline engine test in a fully formulated oil motor at about 5.7 wt. % and gave the results shown below in Table III.

The Sequence VD test evaluate the performance of engine oils in terms of the protection provided against sludge and varnish deposits as well as valve train wear. The test was carried out with a Ford 2.3 liter 4 cylinder gasoline engine using cyclic low and mid range engine operaitng temperatures and a high rate of blowby.

TABLE III

| | 1 | 2 | 3 | 4 | 5 | 6 | SF LIMITS |
|---|---|---|---|---|---|---|---|
| Dispersant, Wt. % | | | | | | | |
| GBSD (H-300 ASAA) | 7.4 | — | — | — | — | — | |
| GBSD (adipic, H-300 ASAA) | — | 7.4 | — | — | — | — | |
| GBSD (adipic, H-100 ASAA) | — | — | 7.4 | — | — | — | |
| GBSD (adipic, H-50) | — | — | — | 7.4 | — | — | |
| GBSD (H-300 ASAA) | — | — | — | — | 7.4 | — | |

TABLE III-continued

|  | 1 | 2 | 3 | 4 | 5 | 6 | SF LIMITS |
|---|---|---|---|---|---|---|---|
| GBSD (adipic, H-50 ASAA) | — | — | — | — | — | 7.4 | |
| Sequence VD | | | | | | | |
| Piston Skirt Varnish | 6.92 | 6.93 | 7.04 | 7.58 | 6.72 | 7.24 | 6.7 min |
| Average Varnish | 5.53 | 6.16 | 6.46 | 6.68 | 6.28 | 7.22 | 6.6 |
| Average Sludge | 9.28 | 9.51 | 9.54 | 9.54 | 9.68 | 9.61 | 9.4 |
| Cam Lobe Wear, max, mils | 0.60 | 0.30 | 0.40 | 0.40 | 0.40 | 0.60 | 2.5 max |
| Cam Lobe Wear, ave, mils | 0.50 | 0.20 | 0.28 | 0.25 | 0.28 | −.36 | 1.0 max |

(1) a. All dispersants were prepared using PEHA polyamine except for GBSD (H-300 ASAA, adipic) which was prepared using TEPA polyamine.
b. All dispersants were evaluated in a single grade SAE 30 SF/CD motor oil formulation at 7.4 wt. % except for GBSD which was evaluated at a 5.0 wt. % treat level.

THE DAIMLER-BENZ VITON COMPATIBILITY TEST

An important property of a lubricating oil additive and a blended lubricating oil composition containing additives is the compatibility of the oil compositon with the rubber seals employed in the engine. Nitrogen-containing succinimide dispersants employed in crankcase lubricating oil compositions have the effect of seriously degrading the rubber seals in internal combustion engines. In particular, such dispersants are known to attack Viton AK-6 rubber seals which are commonly empolyed in internal combusiton engines. This deterioration exhibits itself by sharply degrading the flexibility of the seals and in increasing their hardness. This is such a critical problem that the Daimler-Benz Corporation requires that all crankcase lubricating oils must pass a Viton Seal Compatibility Test before the oil compositon will be rated acceptable for engine crankcase service. The AK-6 Bend Test is described below and is designed to test the Viton seal compatibility for a crankcase lubricating oil composition containing a nitrogen-containing dispersant.

The AK-6 Bend Test is conducted by soaking a sample of Viton AK-6 rubber at an elevated temperature in the oil being tested then determining the bending properties and hardness of the Viton rubber sample against a suitable sample. Specifically, a 38 by 9.5 mm slab of a Viton AK-6 rubber cut with the grain of the rubber is placed in a 30 ml wide-mouth bottle with 20 ml of the test oil. The bottle is sealed and the test sample placed in an oven at 149° C. for 96 hours. The bottle is removed from the oven and the rubber specimen taken from the initial bottle and placed into a second bottle with a new charge of test oil. After 30 minutes in the new oil charge, the rubber specimen is removed from the second bottle and submitted to a Bend Test. This is done by bending the rubber specimen 180°. The degree of cracking is observed and reported as follows: no cracking (NC) surface cracking (SC) or cracking (C). If cracking is observed, the test is terminated on that particular sample.

If no cracking has been observed, the rubber specimen is returned to the bottle containing the second oil charge and this bottle is returned to the oven maintained 149° C., the bottle is removed from the oven and the rubber specimens withdrawn and placed into another bottle containing a fresh oil charge for 30 minutes, following which the bend test is repeated.

If the rubber specimen continues to pass the bend test, the test is continued for 2 more heat-soak cycles of 96 hours and 72 hours respectively, each heat-soak cycle being followed by the bend test for total test time of 336 hours from the time the specimens were initially put into the oven.

Following the above procedure, each rubber specimen is removed from its bottle, washed in naphtha to remove all oil traces and then air dried. The rubber specimens are then submitted to a hardness test according to the procedure described in ASTM D2240 following which a final bend test is made on all specimens.

The results of the Daimler-Benz test runs are provided below in Table IV.

TABLE IV

| DAMLER-BENZ VITON COMPATABILITY TEST | | | | |
|---|---|---|---|---|
| Dispersant[1] | Hardness Change | % Elongation | Elongation Change | Tensile Strength |
| GBSD[2] | −1 | 133 | −46 | 8.3 NM[2] |
| GBSD (H-300 ASAA, adipic) | +1 | 140 | −43 | 9.1 |
| GBSD (H-50 ASAA, adipic) | 0 | 127 | −48 | 7.3 |
| GBSD (H-300 ASAA, adipic)[3] | +1 | 233 | −13 | 10.5 |
| GBSD (H-100 ASAA, adipic) | 0 | 233 | −5.4 | 9.9 |
| GBSD (H-50 ASAA, adipic) | 0 | 167 | −32 | 9.1 |
| GOOD PERFORMANCE | — | 130 min | — | 7.5 min |

[1]a. All dispersants were prepared using PEHA polyamine except for GBSD (H-300 ASAA, adipic) which was prepared using TEPA polyamine.
b. All dispersants were evaluated in a single grade SAE 30 SF/CD motor oil formulation at 7.4 wt. % except for GBSD which was evaluated at a 5.0 wt. % treat level.
[2]GBSD is a glycamide bis-succinimide dispersant (90% bis and 10% mono).
[3]Prepared using TEPA polyamine.
ASAA - Alkenyl succinic acid anhydride; H-50 ASAA (mw ≈ 750); H-100 ASAA (mw ≈ 1000); H-300 ASAA (mw ≈ 1300).
NM[2] - Newton/Millimeter$^2$

We claim:
1. A lubricating oil composition comprising a major portion of a lubricating oil and a minor dispersant amount of a reaction product prepared by the process which comprises:
(a) reacting one mole of a polyethylene amine with an alkenyl succinic acid anhydride to form a bis-alkenyl succinimide;

(b) acylating said bis-alkenyl-succinimide with about 0.5 to about 3.0 equivalents of glycolid acid per mole of said polyethylene amine to form a partially glycolated bis-alkenyl succinimide;

(c) adding a diacid to said partially glycolated bissuccinimide thereby forming a diacid coupled glycamide bis-alkenyl succinidmide; and (d) recovering said diacid coupled glycamide bis-alkenyl succinimide.

2. The lubricating composition of claim 1, wherein tetraethylenepentamine is the polyethylene amine and about 1.7 equivalents of glycolic acid are added per mole of said tetraethylenepentamine.

3. The lubricating composition of claim 1, wherein triethylenetetramine is the polyethylene amine and about 0.7 equivalents of glycolic acid are added per mole of said triethylenetetramine.

4. The lubricating composition of claim 1, wherein pentaethylenehexamine is the polyethylene amine and about 2.7 equivalents of glycolic acid are added per mole of said pentaethylenehexamine.

5. The lubricating oil composition of claim 1, wherein said polyethylene amine is represented by the formula

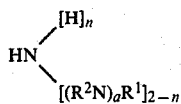

where $R^1$ is H or a hydrocabon selected from the group consisting of alkyl, alalkyl, cycloalkyl, aryl, alkaryl, alkenyl and alkynyl group; $R^2$ is a hydrocarbon selected from the same group as $R^1$ except that $R^2$ contains one less H; a is an integer of about 1 to about 6; and n is 0 or 1.

6. The lubricating oil composition of claim 5, wherein said amine is selected from the group consisting of propylene-diamine, diethylenetriamine, triethylenetetramine, tetraethylene-pentamine and pentaethylenehexamine.

7. The lubricating oil composition of claim 6, wherein said amine is tetraethylenepentamine.

8. The lubricating oil composition of claim 6, wherein said amine is pentaethylenehexamine.

9. The lubricating oil composition of claim 6, wherein said amine is triethylenetetramine.

10. The lubricating oil composition of claim 1, wherein oxalic acid is substituted for said glycolic acid.

11. The lubricating oil composition of claim 1, wherein said diacid is selected from the group consisting of adipic dioleic.

12. A lubricating oil composition comprising a major portion of a lubricating oil and minor dispersant amount of a reaction product prepared by the process which comprises:

(a) reacting an alkenyl succinic acid anhydride with a polyethylene amine

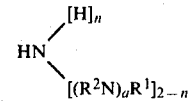

where $R^1$ is H or a hydrocabon selected from the group consisting of alkyl, alalkyl, cycloalkyl, aryl, alkaryl, alkenyl and alkynyl group; $R^2$ is a hydrocarbon selected from the same group as $R^1$ except that $R^2$ contains one less H; a is an integer of about 1 to about 6 and n is 0 or 1, to form a bis-alkenyl succinimide

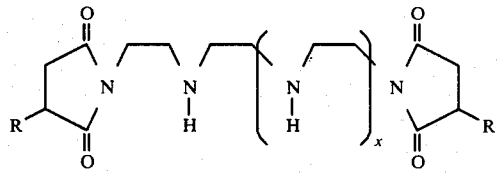

where R is polyisobutylene and x is an integer of 1 to 6;

(b) acylcating said bis-alkenyl-succinimide with a carboxylic acid to form a partially glycolated bis-alkenyl succinimide

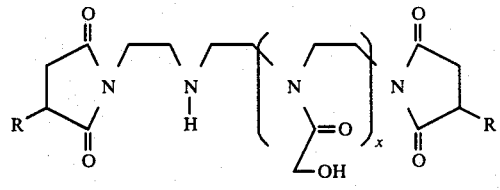

(c) adding a diacid to said partially glycolated bis-alkenyl succinimide, thereby forming a diacid coupled glycamide bis-alkenyl succinimide

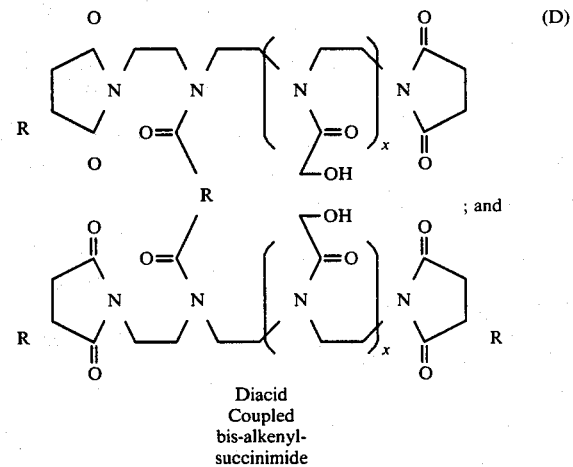

Diacid Coupled bis-alkenyl-succinimide (d) recovering said acylated diacid coupled glycamide bis-alkenyl succinimide.

* * * * *